(12) United States Patent
Bao et al.

(10) Patent No.: US 9,374,432 B2
(45) Date of Patent: Jun. 21, 2016

(54) CROSS-SITE DATA ANALYSIS

(71) Applicant: International Business Machines Corporation, Armonk, NY (US)

(72) Inventors: Sheng Hua Bao, Beijing (CN); Honglei Guo, Beijing (CN); Zhili Guo, Beijing (CN); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 14/048,782

(22) Filed: Oct. 8, 2013

(65) Prior Publication Data

US 2014/0122705 A1    May 1, 2014

(30) Foreign Application Priority Data

Oct. 31, 2012 (CN) .......................... 2012 1 0427841

(51) Int. Cl.
*H04L 29/08* (2006.01)
*G06Q 30/02* (2012.01)

(52) U.S. Cl.
CPC ...................................... *H04L 67/22* (2013.01)

(58) Field of Classification Search
CPC ....... H04L 67/02; H04L 67/20; H04L 9/3271; H04L 63/083; H04L 63/126; H04L 67/22; H04L 63/102; H04L 63/104; H04L 67/306; H04L 63/10; G06F 21/577; G06F 17/30867; G06F 17/3089; G06F 21/554; G06F 17/30899; G06F 17/30861; G06F 17/30864; G06F 17/30994; G06F 17/30386; G06F 17/30702; G06F 21/31; G06F 8/10; G06Q 30/02; G06Q 30/0255; G06Q 30/0251; G06Q 30/0269; G06Q 30/0631; G06Q 30/0241; G06Q 10/063; G06Q 10/0631; G06Q 10/0633
USPC ......... 709/225, 219, 203, 224, 217, 223, 226, 709/227, 232; 707/999, 999.01, 749; 705/14, 14.53, 14.66, 14.42, 14.54, 705/7.11; 715/733, 745, 811
See application file for complete search history.

(56) References Cited

U.S. PATENT DOCUMENTS

| | | | |
|---|---|---|---|
| 6,687,734 B1 * | 2/2004 | Sellink et al. | 709/203 |
| 7,779,103 B1 * | 8/2010 | Fikes et al. | 709/223 |
| 7,788,358 B2 | 8/2010 | Martino | |
| 8,180,778 B1 * | 5/2012 | Pedersen et al. | 707/739 |
| 2002/0055909 A1 * | 5/2002 | Fung et al. | 705/42 |

(Continued)

OTHER PUBLICATIONS

Moo Nam Ko, "User-Centric Secure Cross-site Interaction Framework for Online Social Networking Services," A Dissertation—University of North Carolina, ProQuest 2011, pp. 1-122.

(Continued)

*Primary Examiner* — Alina N Boutah
(74) *Attorney, Agent, or Firm* — Cantor Colburn LLP; David Quinn (57) ABSTRACT

A method for cross-site data analysis includes identifying, by a processing device, based on actions of at least one user in an initial user group in a first side and a second site, at least one action association feature of the first site and the second site, users in the initial user group being members of the first site and the second site; and determining whether a first user name registered in the first site and a second user name registered in the second site belong to a same user based on the at least one action association feature.

16 Claims, 4 Drawing Sheets

(56) References Cited

U.S. PATENT DOCUMENTS

| | | | |
|---|---|---|---|
| 2008/0250026 A1* | 10/2008 | Linden et al. | 707/10 |
| 2009/0048928 A1 | 2/2009 | Gross | |
| 2009/0171754 A1 | 7/2009 | Kane et al. | |
| 2009/0172021 A1* | 7/2009 | Kane et al. | 707/104.1 |
| 2009/0172551 A1* | 7/2009 | Kane et al. | 715/733 |
| 2009/0248680 A1* | 10/2009 | Kalavade | 707/5 |
| 2010/0274815 A1* | 10/2010 | Vanasco | 707/798 |
| 2010/0306832 A1* | 12/2010 | Mu et al. | 726/5 |
| 2011/0055912 A1* | 3/2011 | Fusari | G06F 17/30893 726/8 |
| 2011/0112897 A1* | 5/2011 | Tietzen et al. | 705/14.25 |
| 2011/0131503 A1* | 6/2011 | Graham, Jr. | 715/744 |
| 2011/0191179 A1* | 8/2011 | Linietsky et al. | 705/14.53 |
| 2011/0231305 A1* | 9/2011 | Winters | 705/39 |
| 2011/0258064 A1* | 10/2011 | Agarwal | G06Q 30/02 705/26.1 |
| 2011/0270909 A1* | 11/2011 | Fu | 709/203 |
| 2011/0320462 A1* | 12/2011 | Bao | G06F 17/30867 707/749 |
| 2012/0030621 A1 | 2/2012 | Flinn et al. | |
| 2012/0089590 A1* | 4/2012 | Osann, Jr. | 707/709 |
| 2012/0203639 A1* | 8/2012 | Webster et al. | 705/14.66 |
| 2012/0203865 A1* | 8/2012 | Graham, Jr. | G06Q 30/0255 709/219 |
| 2012/0215621 A1* | 8/2012 | Heffernan et al. | 705/14.41 |
| 2012/0311684 A1* | 12/2012 | Paulsen et al. | 726/6 |
| 2013/0110583 A1* | 5/2013 | Ormont et al. | 705/7.29 |
| 2013/0291093 A1* | 10/2013 | Matsuoka | 726/19 |
| 2015/0066631 A1* | 3/2015 | Nelson et al. | 705/14.45 |

OTHER PUBLICATIONS

DSstar, [online]; [retrieved on Aug. 21, 2012]; retrieved from the Internet http://www.tgc.com/dsstar/02/0402/104093.html DSstar, "WebHancer Indroduces X-Site Intelligence Platform," Business and Money Trail; WebHancer Corporation; DSstar, Apr. 2, 2002, vol. 6, No. 13, pp. 1-3.

* cited by examiner

CROSS-SITE DATA ANALYSIS

PRIORITY

This application claims priority to Chinese Patent Application No. 201210427841.1, filed Oct. 31, 2012 and all the benefits accruing therefrom under 35 U.S.C. §119, the contents of which in its entirety are herein incorporated by reference.

BACKGROUND

The present invention generally relates to the field of data analysis, and more specifically, to a method and system for cross-site data analysis.

At present, networks have become a common medium for people to access, browse, store, and exchange information on a daily basis. From the perspective of an end user, interaction with the network information may be performed through a site on the network (or simply called "website"). With the development of network technology, more and more sites can mine and study user features, for example, interactive habits, preferences, interests, etc., using a technology such as data analysis, and on this basis, provide personalized and/or customized information service to the users. For example, a video service network can infer from a user's browsing history and previous interactive behaviors which type of information the user potentially prefers, and recommend or display video clips related to this type of information in an eye-catching way.

However, different sites and even different columns of the same site might adopt different algorithms and mechanisms to perform data analysis about the user, which prevents the improvement of user experience and operation efficiency. Specifically, suppose a site has accumulated knowledge about the user through a certain period of analysis and study with respect to the user and may thereby provide customized information services. However, when the user accesses another site, the knowledge about the user as accumulated in the previous site cannot be utilized by the current site, and it is possibly even so when the two sites are run by a same provider. Therefore, upon interaction at the new site, the user cannot directly obtain customized personalized services, but has to wait for the site to learn the user's features from the beginning using data analysis.

A feasible approach to address the above problem is leveraging user names of the user at different sites. It would be appreciated that many sites require a user to register to become a member of the site before allowing the user to use the functions of this site. A username of the user in the site is generally selected by the user, composed of for example letters, digits, and some specific symbols. The prior solution is generally based on the following supposition: if the same username appears in two sites, then it is deemed that the username corresponds to a same user. Correspondingly, the user knowledge and analysis results, which are related to the username, may be shared between the two sites.

However, a same user might have different usernames in the same site. First, the user naming mechanisms of sites operated by different providers are usually isolated from each other. Different reference to providers may adopt different username registration mechanisms. Moreover, the user may adopt different usernames in different sites due to various other reasons; for example, the username is registered in advance by another user, subjective willingness, etc. Therefore, this approach still has defects in reliability and stability to perform cross-site data analysis merely dependent on the same username.

SUMMARY

According to one aspect of the present invention, a method for cross-site data analysis is provided. The method comprises: identifying, based on actions of at least one user in an initial user group in a first site and a second site, at least one action association feature of the first site and the second site, users in the initial user group being members of the first site and the second site; and determining whether a first user name registered in the first site and a second user name registered in the second site belong to a same user based on the at least one action association feature.

According to another aspect of the present invention, a system for cross-site data analysis is provided. The system comprises: a feature identifying unit configured to identify, based on actions of at least one user in an initial user group in a first site and a second site, at least one action association feature between the first site and the second site, users in the initial user group being members of the first site and the second site; and a user recognizing unit configured to determine whether a first user name registered in the first site and a second user name registered in the second site belong to a same user based on the at least one action association feature.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure, and wherein.

DETAILED DESCRIPTION

In view of the above problems and other potential problems in the prior art, an improved solution for cross-site data analysis is needed in the art. Therefore, embodiments of the present invention provide a method and system for cross-site data analysis.

It will be clear from the following description that according to embodiments of the present invention, potential identical users between different websites can be effectively detected to realize cross-network information sharing and interaction.

Some specific embodiments will be described in more detail with reference to the accompanying drawings, in which the specific embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
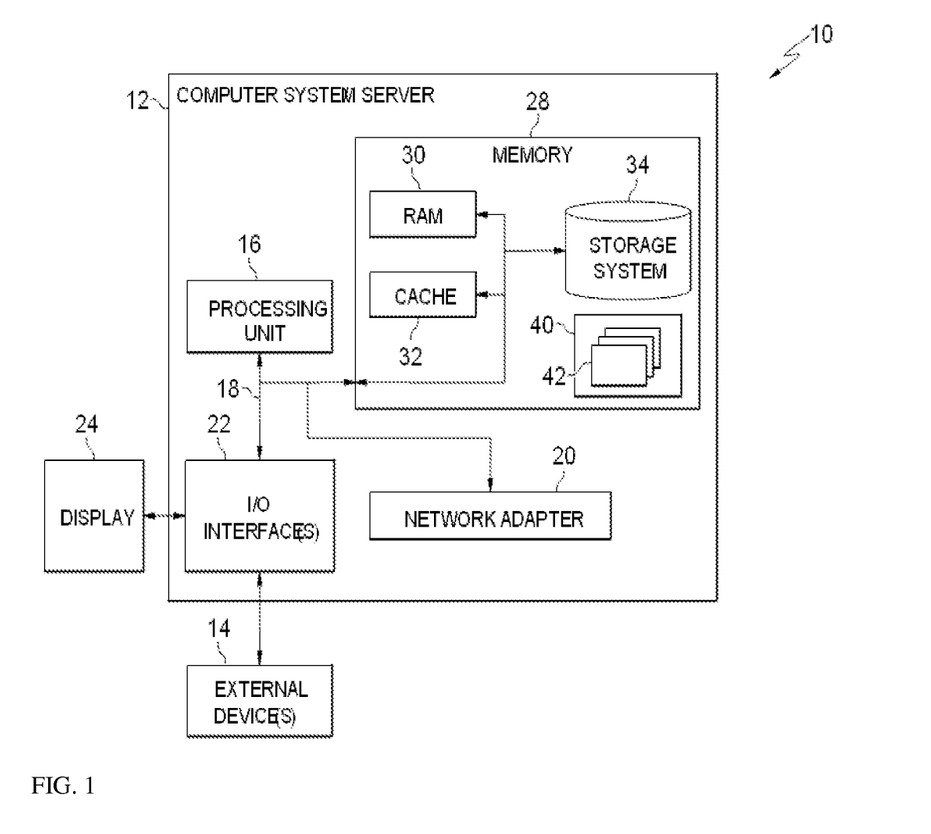
FIG. 1 shows an exemplary computer system 100 which is applicable to implement embodiments of the present invention.

Hereinafter, exemplary embodiments of the present invention will be described in detail with reference to the drawings. FIG. 1 shows an exemplary computer system/server 12 which is applicable to implement embodiments of the present invention; the computer system/server 12 as shown in FIG. 1 is only an example, which should not construct any limitation to the functions and application scope of embodiments of the present invention.

As shown in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not shown in FIG. 1, generally called "a hard disk driver"). Although not shown in FIG. 1, a magnetic disk driver for reading/writing a mobile, non-volatile magnetic disk (for example, a "floppy disk") and an optical disk driver for reading/writing a mobile, non-volatile optical disk (for example, CD-RON, DVD-RON, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As shown in the figure, a network adaptor 20 communicates with other modules of the computer system/server 12 via the bus 18. It should be appreciated that although not shown in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

Figure 2:
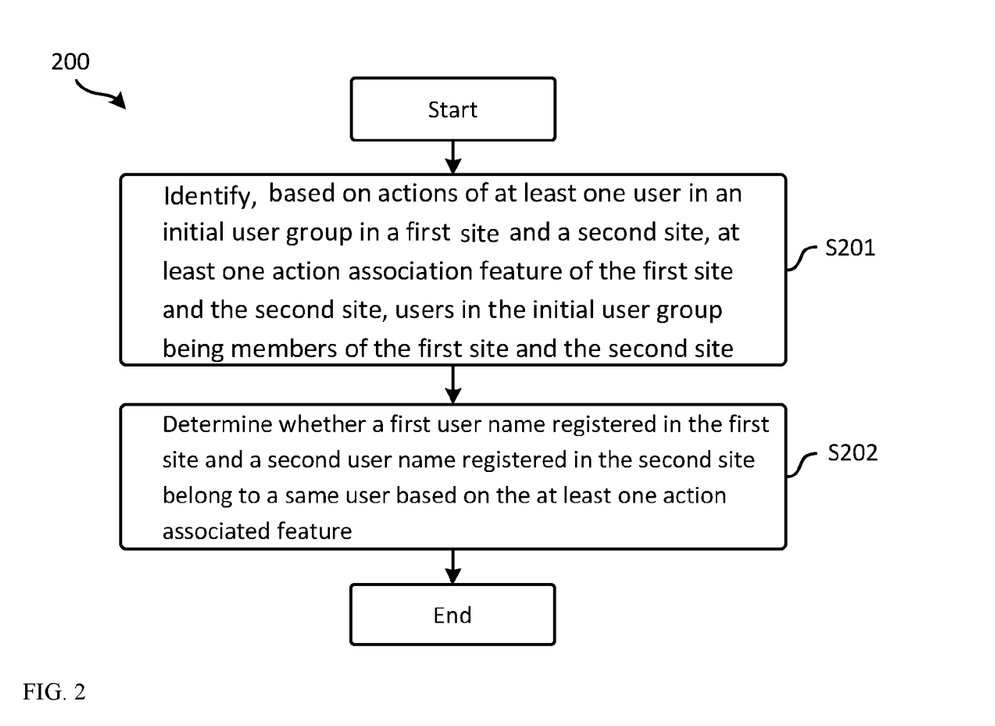
FIG. 2 shows a flow chart of a method 200 for cross-site data analysis according to one exemplary embodiment of the present invention.

Referring now to FIG. 2, there is shown a flow chart of a method 200 for cross-site data analysis according to one exemplary embodiment of the present invention. It should be noted that the term "cross-site" may refer to crossing either different sites or different sections of a same site. Accordingly, terms "first site" and "second site" as used below may be constructed as different sites or different sections of a site.

After the method 200 starts, based on actions of at least one user in an initial user group in a first side and a second site, at least one action association feature between the first site and the second site is identified at block S201.

According to embodiments of the present invention, the initial user group is a user group composed of such users who are members in both the first site and the second site. In other words, each user has a username in both the first site and the second site. According to embodiments of the present invention, there are various approaches capable of determining the initial user group. It would be appreciated that the "member" here may be a registered long-term valid member or a temporary member who may perform actions merely in a limited time and/or have limited action authorities.

For example, according to some embodiments of the present invention, it may be regarded that the same usernames in the first site and the second site belongs to the same user. Therefore, users having the same usernames in the first site and the second site may be selected into the initial user group. In other words, at least one user in the initial user group may have the same username in the first site and the second site. Specifically, if the first site has a username "Alice01" and the second site also has a username "Alice01," then it is regarded that these two usernames associated with the different sites belong to the same user. For another example, if the usernames in the two sites are similar enough, they may also be regarded as belonging to the same user.

Alternatively or additionally, according to some embodiments of the present invention, the at least one user considered in block S201 may be determined in a manual approach. Specifically, one or more users may be invited through for example a questionnaire to indicate whether they have registered with both the first site and the second site, and indicate their respective usernames in the two sites. In this manner, the initial user group can be likewise determined.

What have been described above are merely exemplary methods for determining an initial user group, and any other alternative or additional method is also feasible.

At block 201, for at least one user in the initial user set, his/her actions in the first site and second site may be obtained and stored. These actions comprise at least one of the following: publishing, browsing, interacting with, deleting, referencing to various information in a site. The information about these actions may be stored in any appropriate storage medium so as to be available for future use. The stored information may include at least one of the following items: description of the action, type of the action, content or its index manipulated by the action, time when the action occurs, etc.

Based on these actions, an action association feature of the same user between the first site and the second site can be identified or mined. The term "action association feature" as used here is a statistical feature for indicating a regular inherent link between actions performed by the same user in the first site and the second site. It would be appreciated that it is supposed here that actions of a same user between different sites always have a certain inherent link. The practice has proved reasonability of this supposition.

For example, if it is found that more than a predetermined percentage or number of users in the initial user group perform another specific action (denoted as the second action) within a given time period T after performing a specific action (denoted as the first action) in the first site, it may be regarded that such action association is regular, and then a corresponding action association feature may be created. Considering a more specific example, it is supposed that the first site is a video service site and the second site is a microblog service site. If it is found that more than a predetermined percentage or number of users in the initial user group, after posting a segment of video clip, will post a microblog referencing to the video clip in the second site within for example 15 minutes, then this can be regarded as a regularity feature when the same user operates in the first site and the second site. Correspondingly, this regularity may be indicated in the action association feature. The above is merely an example. Hereinafter, more examples in this aspect will be described with reference to FIG. 2.

Next, the method 200 proceeds to block S202 where it is determined whether the first user name registered in the first site and the second username registered in the second site belong to the same user based on the at least one action association feature as identified in block S201.

As mentioned above, the action association feature indicates the regularity feature of the same user when operating in the first site and the second site. Therefore, by determining whether the action performed by the user corresponding to the first username in the first site and the action performed by a user corresponding to the second username conform to or have one or more such action association features, it may be determined whether the first username registered in the first site and the second username registered in the second site belong to the same user.

Still considering the above example, if the action association feature derived at block S201 indicates that the same user usually performs the second action in the second site within a time period T after performing the first action in the first site, then at block S202, it may be determined whether the user corresponding to the second username performs the second action in the second site within the time period T after the user corresponding to the first username performs the first action (if available) in the first site. For example, in the above example, it may be determined whether the user corresponding to the second username posts a microblog message referencing to the published video clip in the second site within 15 minutes after the user corresponding to the first username publishes the video clip in the first site (video service site). If so, the possibility for the first username and the second username belonging to the same user may be enhanced correspondingly. Similar operations may be performed for other action association features. If the possibility for the first username and the second username belonging to the same user exceeds a predetermined threshold value, it may be deemed that the first username and the second username belong to the same user.

The method 200 ends after block S202.

By performing the method 200, the action association feature of the same user between two sites may be identified from the initial user set (for example, those users having the same username in the first site and the second site). Then, such a general, statistical feature may be utilized to determine the same user in two sites, even though his/her usernames in the first site and second site are different.

It is advantageous to determine a same user in different sites. For example, the knowledge about the user which has been learned and accumulated in one site may be shared with other site, so as to provide a more accurate, personalized and friendly customized information service to the user in the other site. It should be understood that after determining a same user in different sites, cross-site information sharing may be realized in various manners, and the scope of the present invention will not be limited in this aspect.

Figure 3:
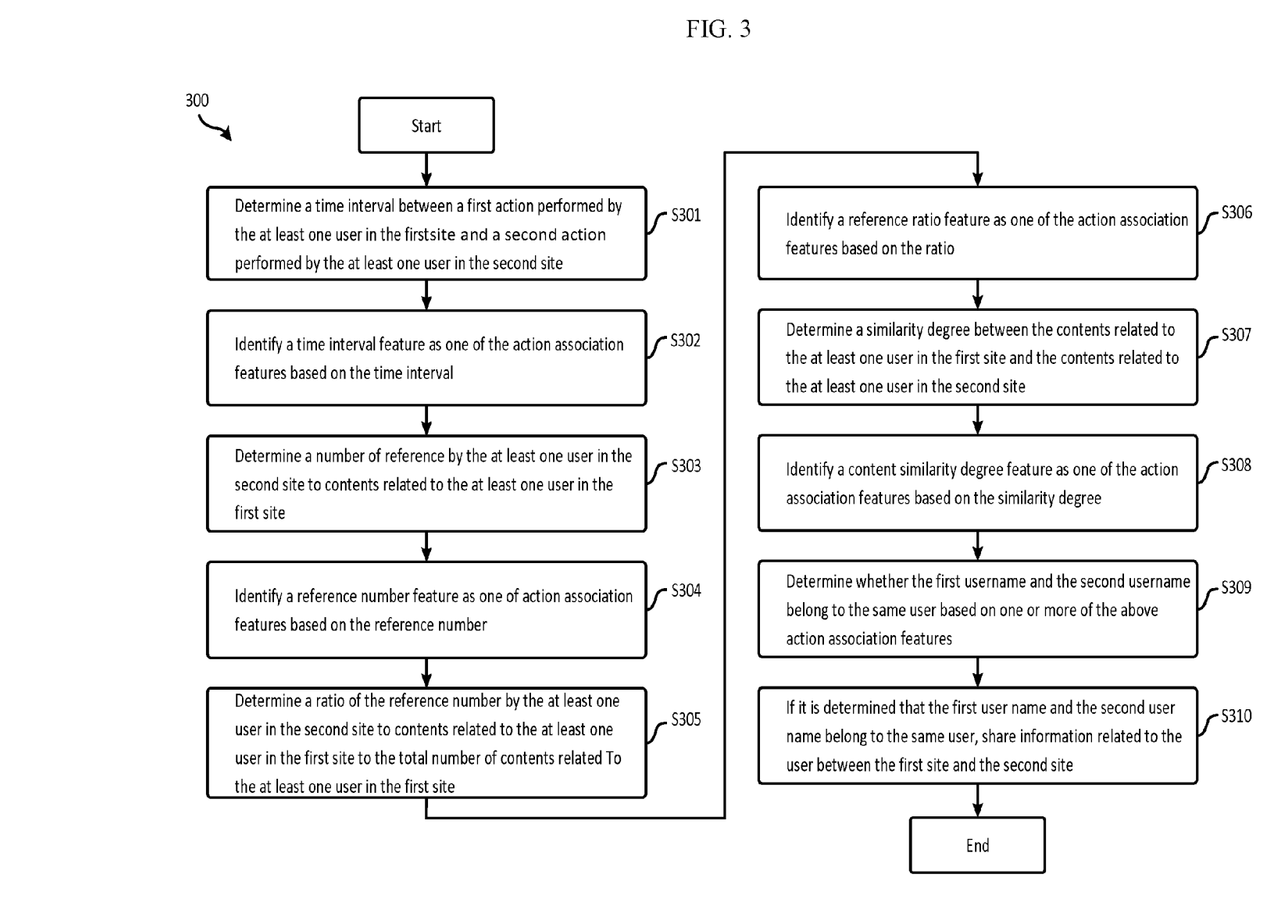
FIG. 3 shows a flow chart of a method 300 for cross-site data analysis according to one exemplary embodiment of the present invention.

Referring now to FIG. 3, there is shown a flow chart of a method 300 for cross-site data analysis according to one exemplary embodiment of the present invention. The method 300 may be regarded as a particular implementation of the method 200 as above described with reference to FIG. 2.

After the method 300 starts, at block S301, a time interval between a first action in the initial user group and a second action in the second site, which are performed by at least one user in the initial user group, is determined.

As above mentioned, the user in the initial user set is a user for both the first reference to and the second site. Specifically, according to some embodiments, at least one user in the initial user set has a same registered username in the first site and the second site. Of course, other appropriate manners of determining an initial user set are also feasible.

According to these embodiments, the first action may be publishing contents in the first site by the user, for example, publishing a video clip in a video service site, and the second action may be referencing to the published contents in the second site, for example, posting a microblog in a microblog service site to reference to the video clip published in the video service site. As mentioned above, when recording the information of the first action and the second action, time of occurrence of each action may be recorded (for example, as time stamp). Therefore, a time interval between the occurrence time of the first action in the first site and the occurrence time of the second action in the second site may be calculated. The above is only an example, and the time interval between other actions may also be counted.

Next, the method 300 proceeds to block S302, where a time interval feature is identified as an action association feature based on the time interval. According to embodiments of the present invention, if the above time interval is less than a time interval for more than a predetermined number or percentage of users in the initial user group, it may be regarded that a regularity in time interval exists between the first action executed by the same user in the first reference to and the second action executed in the second site. Accordingly, an action association feature indicating the first action, the second action, and the time interval threshold may be created.

Next, the method 300 proceeds to block S303, where it is determined a number of reference by the at least one user in the second site to contents related to the user in the first site. Here, the content is related to the user means the content is published, modified, commented, concerned, manipulated by the user or otherwise associated with the user. Besides, the term "reference" used here means that the user refers to or mentions in the second site relevant content in the first site in any currently known or future developed manner. As an example, the user may post a microblog in the microblog service site (the second site) to reference to a video clip related to the user in the video service site (the first site), for example, by a uniform resource locator (URL) directed to the video clip.

The method 300 then identifies a reference number feature as the action association feature based on the reference number at block S304. According to embodiments of the present invention, if for more than a predetermined number or percentage of users in the initial user group, the number of reference in the second site to the contents related to the users themselves in the first site exceeds a predetermined threshold, it may be regarded that the same user usually trends to reference to the contents in the first site related to himself/herself in the second site. Therefore, an action association feature indicating a reference number threshold may be created.

Next, the method 300 proceeds to block S305, where a ratio of a number of references by the at least one user in the second site to contents related to the at least one user in the first site to a total number of contents related to the at least one user in the first site (i.e., a reference ratio) is determined. As an example, suppose a user has N related contents in the first site and references to M contents out of them in the second site, then the reference ratio of the user is M/N.

The method 300 then identifies in block S306 a reference ratio feature as the action association feature based on the reference ratio. According to embodiments of the present invention, if for more than a predetermined number or percentage of users in the initial user group, the reference ratio in the second site of the contents related to the users themselves in the first site exceeds a predetermined threshold, it may be regarded that the same user usually trends to frequently reference to contents in the first site related to himself/herself in the second site. Therefore, an action association feature indicating a reference ratio threshold may be created.

Next, the method 300 proceeds to block S307, where a similarity degree between the contents related to the at least one user in the first site and the contents related to the at least one user in the second site is determined. According to embodiments of the present invention, a similarity degree between two contents may be detected by any currently known or future developed appropriate means.

For example, for a textual content, there are various manners capable of determining the content similarity degrees between two segments of texts are known. For example, keywords in the two segments of textual contents may be extracted, and the categories of these keywords may be determined. The more keywords belonging to the same category the two segments of texts include, the more similar they may be regarded. Alternatively or additionally, the text similarity may also be determined in a manner of whole-text comparison and the like. Manual or semi-manual operations may also be employed to determine text similarity.

Likewise, for audio, video or other multimedia content, the content similarity may be determined through textual contents such as the associated abstract, index, description information and the like. Alternatively or additionally, a content-based multimedia processing may also be employed to determine the similarity between two segments of multimedia information. These methods are already known in the present field, which does not constitute a restriction to the scope of the present invention; therefore, it will not be detailed here.

The method 300 then identifies a content similarity degree feature as the action association feature based on the content similarity degree at block S308. According to embodiments of the present invention, if for more than a predetermined number or percentage of users in the initial user group, the similarity degree of the contents related to the user in the first and second sites exceeds a predetermined threshold, it may be regarded that the contents related to the same user in the first and second sites tend to be similar to each other. Therefore, an action association feature indicating a content similarity degree threshold may be created.

Next, at block S309, it is determined whether the first username in the first site and the second username in the second site belong to the same user based on one or more of the above action association features. Specifically, if the action executed by the user corresponding to the first username in the first site and the action executed by the user corresponding to the second username in the second site have one or more features among the action association features in blocks S302, S304, S306, and S308, it may be determined that the first username and the second username belong to the same user.

For example, if it is determined that the first action associated with the first username and the second action associated with the second username satisfy the time interval feature in time, then the possibility that the first username and the second username belong to the same user may be correspondingly improved. It is so for other action association features. When this possibility exceeds the predetermined threshold, it may be regarded that the first username and the second username belong to the same user.

Specifically, according to some embodiments of the present invention, different action association features may have different weights, which may be flexibly determined based on the requirements and specific situations. It is also possible for other quantitative and/or qualitative manners of calculation.

Next, the method 300 proceeds to the alternative block S310. At block S310, if the first username and the second username are determined as belonging to the same user, then information related to the user is shared between the first site and the second site. For example, various personalized information about the user's characteristics, preferences, interactive habits, and interests as already studies and accumulated in the first site may be transmitted to the second site, such that the second site uses such information to provide various customized information services. For example, the second site may recommend contents, configure personal settings, adjust the layout of the graphical user interface (GUI), deliver personalized information (user message, system message, advertising message, etc.), etc., for the user. The scope of the present invention is not limited thereto.

The method 300 ends after block S310.

It should be understood that the above action association features as described with reference to FIG. 3 are merely exemplary. For example, other alternative and/or additional action association features may be considered. Moreover, the above action association features are not all essential, and only any one or more, instead of all, of them may be considered in actuality. Further, it should be also noted that the execution sequences of blocks S301, S303, S305, and S307 are merely exemplary. Those skilled in the art can understand undoubtedly that a plurality of action association features may be determined in any suitable sequence or even in parallel. Correspondingly, the above operations may be executed in a sequence different from what is illustrated in FIG. 3, and in some embodiments, they may be executed in parallel.

Figure 4:
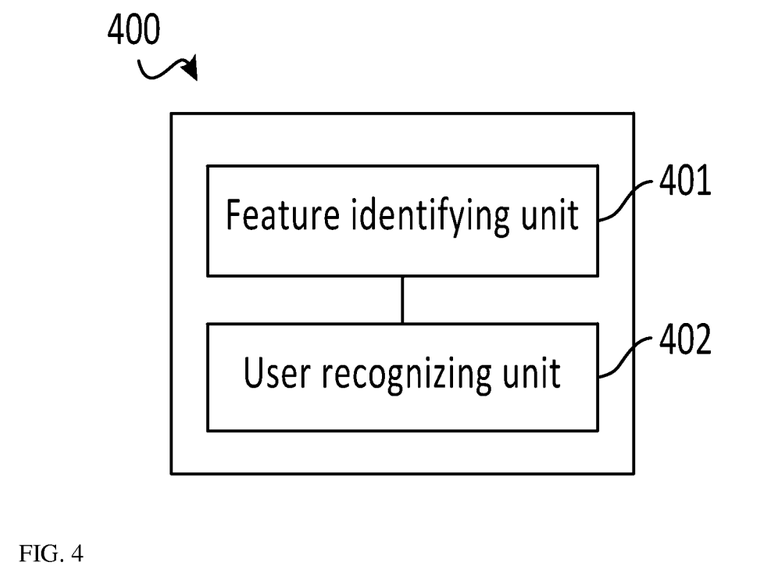
FIG. 4 shows a block diagram of a system 400 for cross-site data analysis according to one exemplary embodiment of the present invention.

Referring now to FIG. 4, a block diagram of a system 400 for cross-site data analysis according to one exemplary embodiment of the present invention is shown. As shown in FIG. 4, according to embodiments of the present invention, the system 400 comprises a feature identifying unit 401 configured to identify, based on actions of at least one user in an initial user group in a first site and a second site, at least one action association feature between the first site and the second site. According to embodiments of the present invention, the users in the initial user group are members in both the first site and the second site. Besides, the system 400 further comprises a user recognizing unit 402 configured to determine whether a first user name registered in the first site and a second user name registered in the second site belong to a same user based on the at least one action association feature.

According to some embodiments of the present invention, the feature identifying unit 401 may comprise: a time interval determining unit configured to determine a time interval between a first action performed by the at least one user in the first site and a second action performed by the at least one user in the second site; and a time interval feature identifying unit configured to identify a time interval feature based on the time interval as one of the at least one action association feature. According to some embodiments of the present invention, the first action is publishing contents in the first site, and the second action is referencing to in the second site the contents as published in the first site.

According to some embodiments of the present invention, the feature identifying unit 401 may comprise: a reference number identifying unit configured to determine a number of references by the at least one user in the second site to contents related to the at least one user in the first site; and a reference number feature identifying unit configured to identify a reference number feature based on the reference number as one of the at least one action association feature.

According to some embodiments of the present invention, the feature identifying unit may comprise: a reference ratio determining unit configured to determine a ratio of a number of references by the at least one user in the second site to contents related to the at least one user in the first site to a total number of contents related to the at least one user in the first site; and a reference ratio feature identifying unit configured to identify a reference ratio feature as one of the at least one action association feature based on the ratio.

According to some embodiments of the present invention, the feature identifying unit 401 may comprise: a similarity degree determining unit configured to determine a similarity degree between contents related to the at least one user in the first site and contents related to the at least one user in the second site; and a similarity degree feature identifying unit configured to identify a content similarity degree feature based on the similarity degree as one of the at least one action association feature.

According to some embodiments of the present invention, the user recognizing unit 402 may comprise: a first determining unit configured to determine, if an action performed by a user corresponding to the first user name in the first site and an action performed by a user corresponding to the second user name in the second site have one or more of the at least one action association feature, that the first user name and the second user name belong to a same user.

According to some embodiments of the present invention, the system 400 may further comprise: an information sharing unit configured to share, if it is determined that the first user name and the second user name belong to the same user, information related to the user between the first site and the second site.

According to some embodiments of the present invention, at least one user in the initial user set has a same registered username in the first site and the second site.

For the sake of clarity, FIG. 4 does not show alternative units or sub-units comprised in the system 400. It should be understood that various units or sub-units comprised in system 400 correspond to corresponding blocks of method 200 and method 300 as described with reference to FIG. 2 and FIG. 3, respectively. Thus, all of the above features and operations as described for method 200 and method 300 are likewise applicable to the system 400, respectively, which thus will not be detailed here.

Moreover, the partitioning of the units or subunits in system 400 are not limiting, but exemplary, intended to describe their major functions or operations logically. The functions of a single unit as shown in FIG. 4 may be implemented by multiple units. On the contrary, the multiple units as illustrated in FIG. 4 may also be implemented by a single unit. The scope of the present invention is not limited thereto.

In particular, the units comprised in the system 400 may be implemented in various manners, comprising software, hardware, firmware, or any combination thereof. For example, according to some embodiments of the present invention, various units of the system 400 may be implemented using software and/or firmware modules. At this point, as above mentioned, these software units may implement optical-electrical conversion or electrical-optical conversion through calling other modules or devices. Alternatively or additionally, the units of the system 400 may also be implemented using hardware. For example, various units of the system 400 may be implemented as an integrated circuit (IC) chip, an application specific integrated circuit (ASIC), a field programmable gate array (FPGA), a system on chip (SOC), etc. Other manners that are currently known or developed in the future are also feasible, and the scope of the present invention is not limited thereto.

Through the above description, it would be appreciated that according to embodiments of the present invention, for any two sites in the network, common action association features of the same user between two sites may be first mined, studied and identified based on the actions of the users who are members of the both sites. The action association features statistically indicate regular inherent link of the actions performed by the same user between the two sites. And then identical users having different usernames in the two sites may be determined based on this link. It is advantageous to determine identical users in different sites, for example, user information may be shared between these sites, thereby facilitating personalized customized information services for the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for cross-site data analysis, comprising:
a graphical user interface (GUI) that allows a user to enter actions;
identifying, by a processing device, based on actions of at least one user in an initial user group in a first site and a second site, the first and second site being websites on at least one communication network accessible via the graphical user interface, at least one action association feature of the first site and the second site, users in the initial user group being members of the first site and the second site;
determining, by the processing device, whether a first user name registered in the first site and a second user name registered in the second site belong to a same user based on the at least one action association feature by comparing textual information of the first and second user names; and based on a determination that the first user name and the second user name belong to the same user, sharing information related to the user between the first site and the second sit such that the second site uses the information to provide customized information services.

2. The method according to claim 1, wherein identifying, based on actions of at least one user in an initial user group in a first site and a second site, at least one action association feature of the first site and the second site comprises:
  determining a time interval between a first action performed by the at least one user in the first site and a second action performed by the at least one user in the second site; and
  identifying a time interval feature based on the time interval as one of the at least one action association feature.

3. The method according to claim 2, wherein the first action is publishing content in the first site, and wherein the second action is referencing to the published content in the second site.

4. The method according to claim 1, wherein identifying, based on actions of at least one user in an initial user group in a site and a second site, at least one action association feature between the first site and the second site comprises:
  determining a number of references by the at least one user in the second site to contents related to the at least one user in the first site; and
  identifying a reference number feature based on the reference number as one of the at least one action association feature.

5. The method according to claim 1, wherein identifying, based on actions of at least one user in an initial user group in a first site and a second site, at least one action association feature between the first site and the second site comprises:
  determining a ratio of a number of references by the at least one user in the second site to contents related to the at least one user in the first site to a total number of contents related to the at least one user in the first site; and
  identifying a reference ratio feature as one of the at least one action association feature based on the ratio.

6. The method according to claim 1, wherein identifying, based on actions of at least one user in an initial user group in a site and a second site, at least one action association feature between the first site and the second site comprises:
  determining a similarity degree between contents related to the at least one user in the first site and contents related to the at least one user in the second site; and
  identifying a content similarity degree feature based on the similarity degree as one of the at least one action association feature.

7. The method according to claim 1, wherein at least one user in the initial user group has a same user name in the first site and the second site.

8. The method according to claim 1, wherein the determining whether a first user name registered in the first site and a second user name registered in the second site belong to a same user based on the at least one action association feature comprises:
  if an action performed by a user corresponding to the first user name in the first site and an action performed by a user corresponding to the second user name in the second site have one or more of the at least one action association feature, determining that the first user name and the second user name belong to a same user.

9. A system for cross-site data analysis, comprising:
  a graphical user interface (GUI) that allows a user to enter actions;
  a processor in communication with one or more types of memory, the processor configured to:
  identify, based on actions of at least one user in an initial user group in a first site and a second site, the first and second site being websites on at least one communication network accessible via the graphical user interface, at least one action association feature of the first site and the second site, users in the initial user group being members of the first site and the second site;
  determine whether a first user name registered in the first site and a second user name registered in the second site belong to a same user based on the at least one action association feature by comparing textual information of the first and second user names; and
  share, based on a determination that the first user name and the second user name belong to the same user, information related to the user between the first site and the second site such that the second site uses the information to provide customized information services.

10. The system according to claim 9, wherein identifying the at least one action association feature further comprises:
  determining a time interval between a first action performed by the at least one user in the first site and a second action performed by the at least one user in the second site; and
  identifying a time interval feature based on the time interval as one of the at least one action association feature.

11. The system according to claim 9, wherein the first action is publishing content in the first site, and wherein the second action is referencing to the published content in the second site.

12. The system according to claim 9, wherein identifying the at least one action association feature further comprises:
  determining a number of references by the at least one user in the second site to contents related to the at least one user in the first site; and
  identifying a reference number feature based on the reference number as one of the at least one action association feature.

13. The system according to claim 9, wherein identifying the at least one action association feature further comprises:
  determining a ratio of a number of references by the at least one user in the second site to contents related to the at least one user in the first site to a total number of contents related to the at least one user in the first site; and
  identifying a reference ratio feature as one of the at least one action association feature based on the ratio.

14. The system according to claim 9, wherein identifying the at least one action association feature further comprises:
  determining a similarity degree between contents related to the at least one user in the first site and contents related to the at least one user in the second site; and
  identifying a content similarity degree feature based on the similarity degree as one of the at least one action association feature.

15. The system according to claim 9, wherein at least one user in the initial user group has a same user name in the first site and the second site.

16. The system according to claim 9, wherein the comprises:
 determining, if an action performed by a user corresponding to the first user name in the first site and an action performed by a user corresponding to the second user name in the second site have one or more of the at least one action association feature, that the first user name and the second user name belong to a same user.

\* \* \* \* \*